(12) United States Patent
Thompson (10) Patent No.: US 12,027,838 B2
(45) Date of Patent: Jul. 2, 2024

(54) CABLE MANAGEMENT DEVICES

(71) Applicant: Dino Group Pty Ltd, Camp Hill (AU)

(72) Inventor: Scott Thompson, Camp Hill (AU)

(73) Assignee: Dino Group Pty Ltd, Camp Hill (AU)

( * ) Notice: Subject to any disclaimer, the term of this patent is extended or adjusted under 35 U.S.C. 154(b) by 22 days.

(21) Appl. No.: 17/674,665

(22) Filed: Feb. 17, 2022

(65) Prior Publication Data

US 2022/0263301 A1    Aug. 18, 2022

(30) Foreign Application Priority Data

Feb. 18, 2021    (AU) ............................... 2021900422

(51) Int. Cl.
*H02G 3/04* (2006.01)
*F16L 3/06* (2006.01)
*F16M 13/02* (2006.01)

(52) U.S. Cl.
CPC .............. *H02G 3/0456* (2013.01); *F16L 3/06* (2013.01); *F16M 13/022* (2013.01)

(58) Field of Classification Search
CPC ........ H02G 3/0456; F16L 3/06; F16M 13/022
See application file for complete search history.

(56) References Cited

U.S. PATENT DOCUMENTS

| | | | | |
|---|---|---|---|---|
| 1,133,388 A | * | 3/1915 | Merrill ..................... | G09F 3/201 24/67.5 |
| 1,220,717 A | | 3/1917 | Bennett | |
| 2,461,071 A | * | 2/1949 | Mettenleiter ........ | A47G 29/083 248/227.2 |
| 2,565,719 A | * | 8/1951 | Church ................ | A47G 29/083 248/215 |
| 5,893,539 A | * | 4/1999 | Tran ..................... | H02G 3/0443 248/68.1 |
| 6,345,796 B1 | | 2/2002 | Neuman | |
| 6,378,827 B1 | * | 4/2002 | Kacines ............... | A47G 29/087 24/546 |
| 6,477,744 B1 | * | 11/2002 | Miles ................... | B43K 23/002 24/3.12 |

(Continued)

FOREIGN PATENT DOCUMENTS

| | | | |
|---|---|---|---|
| DE | 29913965 | 11/1999 | |
| DE | 29913965 U1 * | 11/1999 | ............. A47B 21/06 |
| EP | 0478511 | 4/1992 | |

OTHER PUBLICATIONS

2 Packs Cable Management Tray, [retrieved from internet on Nov. 30, 2021]; Date First Available Nov. 26, 2018; URL: https://www.amazon.com.au/Management-inches-Organizer-Offices-Kitchens/dp/B07Q5W52DT/ref=asc_df_B07Q5W52DT/?tag=googleshopdsk-22&linkCode=df0&hvadid=341743286100&hvpos=&hvnetw=g&hvrand=2337312839191248294&hvpone=&hvptwo=&hvqmt=&hvdev=c&hvdvcmdl=&hvlocint=&hvlocphy=9071970&hvtargid=pla-769926729295&th=1 > (Mar. 29, 2020).

*Primary Examiner* — Monica E Millner
(74) *Attorney, Agent, or Firm* — Margaret S. Millikin (57) ABSTRACT

A cable support device, cable tie and cable tidy are provided. The cable support device includes a retainer, for retaining the cable support device to an edge of a surface, such as a desk or table, and a cable support, coupled to the retainer, and configured to support one or more cables. The retainer comprises: a planar upper support member; and an opposing biasing member, configured to bias the surface towards the planar upper support member to thereby retain the retainer to the surface. The biasing member tapered along its length, such that it is more flexible at its end.

20 Claims, 11 Drawing Sheets

(56) References Cited

U.S. PATENT DOCUMENTS

| | | | | |
|---|---|---|---|---|
| 8,308,125 B2* | 11/2012 | Losaw | ............... | A47G 29/083 |
| | | | | 248/339 |
| 8,596,588 B1* | 12/2013 | Sikkema | ............... | H02G 3/30 |
| | | | | 248/220.21 |
| 8,985,530 B2* | 3/2015 | Jette | ................ | H02G 3/0443 |
| | | | | 248/65 |
| 9,080,715 B2* | 7/2015 | Biddle | ............... | F16M 13/022 |
| 9,402,483 B2* | 8/2016 | Kaalberg | ........... | A47C 21/022 |
| 10,022,006 B1* | 7/2018 | Williams | ........... | F16M 13/022 |
| 10,035,371 B2* | 7/2018 | Büttner | ............. | B43K 23/001 |
| 11,168,836 B2* | 11/2021 | Kelly | ................ | F16B 7/0493 |
| 2001/0030267 A1* | 10/2001 | Caveney | ............ | H04Q 1/06 |
| | | | | 248/62 |
| 2015/0159778 A1* | 6/2015 | Kuhm | ............... | H02G 3/32 |
| | | | | 248/74.2 |
| 2015/0276093 A1 | 10/2015 | Aotani | | |
| 2016/0025244 A1* | 1/2016 | Tally | ................. | H02G 3/32 |
| | | | | 29/428 |
| 2016/0264030 A1* | 9/2016 | Saiga | ................. | B60N 2/5825 |
| 2020/0011453 A1* | 1/2020 | Allender-Zivic | ........ | F16L 3/06 |
| 2020/0252714 A1* | 8/2020 | Mainini | ............. | H04R 1/1033 |
| 2022/0200523 A1* | 6/2022 | Truthseeker | .......... | H02S 40/34 |

* cited by examiner

CABLE MANAGEMENT DEVICES

TECHNICAL FIELD

The present invention relates to cable management devices, and in particular, although not exclusively, to devices for managing cables in workstations and desks.

BACKGROUND ART

As technology becomes more and more commonplace in offices and office-like environments, the number of power and signal cables has increased. In a single typical workstation, a large number of cables is present, including display signal and power cables, computer power and network cables, as well as cables for peripherals and accessories, such as desk lights, printers, speakers, phone chargers and other devices. When several workstations are provided in proximity to each other, the number of cables is increased even further.

Allowing cables to simply hang behind desks is not only unsightly, but can form a hazard. Furthermore, such cables may tangle and disengage, causing problems with the equipment to which they are attached.

Various attempts have been made to improve the way cables are managed in such environments, including as outlined below.

Office desk systems exist that have inbuilt cable management systems, including apertures through which cables extends, cable guides, cable channels, cable holders and the like. A problem with such office desk systems is that they are not able to be easily retrofit to existing office environments without replacing significant amounts of office furniture.

Certain cable management systems, including cable trays and holders, exist, which are configured to be attached to office desks, e.g. using screws or other fasteners. A problem with such systems is that they are difficult and time-consuming to install, and damage the desks or equipment on which they are installed. Furthermore, such systems are not easily reconfigurable as needs change.

Cable straps and cable ties are known, which are used to bunch and keep cables together. While having the benefit of not being permanent, such solutions are generally flimsy. Furthermore, it is generally difficult to add or remove cables at a later time, e.g. when equipment is being replaced or upgraded.

As such, there is clearly a need for improved cable management devices and systems.

It will be clearly understood that, if a prior art publication is referred to herein, this reference does not constitute an admission that the publication forms part of the common general knowledge in the art in Australia or in any other country.

SUMMARY OF INVENTION

The present invention is directed to cable management devices and systems which may at least partially overcome at least one of the abovementioned disadvantages or provide the consumer with a useful or commercial choice.

With the foregoing in view, the present invention in one form, resides broadly in a cable support device including:
 a retainer, for retaining the cable support device to an edge of a surface, such as a desk of table, the retainer comprising:
  a planar upper support member; and
  an opposing biasing member, configured to bias the surface towards the planar upper support member to thereby retain the retainer to the surface; and
 a cable support, coupled to the retainer, and configured to support one or more cables.

Advantageously, the cable support device may be quickly and releasably attached to desks, tables and the like, and without damaging the surface. As such, the cable support device provides a cost effective means of providing a cable support that is easily usable and re-configurable.

Preferably, the cable support comprises an open segment.

Preferably, the cable support comprises an arm, extending from a base of the retainer. The arm may be curved. The arm may include one or more bends.

The cable support may be U-shaped in cross-section.

The cable support may initially extend downwardly from the retainer, and subsequently upwardly. The cable support may thus function as a hook.

The cable support may include a lip or edge to prevent cables sliding out from the cable support.

The biasing member may be resilient, and configured to apply resilient force to the surface in a direction of the upper support member.

The biasing member may be curved.

The biasing member may be tapered along its length, such that it is more flexible at its end.

The retainer may comprise a C-channel, wherein the biasing member is provided on an inside of the C-channel.

The biasing member may function as a leaf spring against the surface.

Preferably, the retainer is configured to conform to surfaces of different thicknesses.

The planar upper support member may be coupled to the opposing biasing member by an intermediate member. The intermediate member may be coupled to the planar upper support member at a right angle.

The cable support may extend from a lower portion of the biasing member.

The cable support may extend downwardly from the biasing member.

The cable support may extend outwardly from the biasing member.

The device may be substantially uniform in width.

The device may be substantially uniform in cross-section.

The cable support may include a retaining portion that is larger than its opening. The retaining portion and opening may be sized to receive a head of a power plug and retain the power plug therein.

In one embodiment, the retainer and the cable support may be formed of a continuously extending member. The continuously extending member may curve to form the retainer and the cable support.

The retainer may include a gripping member attached thereto. The gripping member may be formed of anti-slip member, such as rubber or rubber-like material. The ant-slip member may be formed of a thermoplastic elastomer (TPE).

The planar upper support member may include the gripping member on an inside thereof.

The planar upper support member may include an aperture through which the gripping member may partially extend. Such configuration may enable the gripping member to be attached to the planar upper support member without the use of adhesives.

The cable support may be configured to receive a tray, for supporting the one or more cables.

The tray may extend between cable supports of adjacent devices.

The tray may be of substantially the same cross section as an inside of the cable support.

The tray may be formed of polypropylene. The tray may be about 1.2 or 1.5 mm thick.

The cable support may include notches for receiving and retaining edges of the tray.

The retainer and the cable support may be unitarily formed. The device may be unitarily formed of plastic or plastic-like material. In one embodiment, the device is formed of Acetal Polyoxymethylene (POM)

In another form, the invention resides broadly in a cable tie comprising an elongate member having uniform cross-section along its length, the elongate member including one or more male members on at least one of an inside and an outside if the elongate member, and one or more corresponding female members on the other of the inside and outside of the elongate member, such that the male and female members may engage with each other to lock the cable tie into a loop.

Preferably, the male and female members releasably engage with each other.

Preferably, the male and female members are bulb-shaped. Alternatively, the male and female members may be dovetail shaped.

The male and female members may be provided on both the inside and the outside of the cable tie.

The male and female members may be repeated along a width of the cable tie.

In another form, the invention resides broadly in a cable tidy comprising a wire member that is folded back and forward in a zig-zag like manner, forming a repetitive pattern of open rings, such that the openings of each of the rings is aligned along the length of the tidy, thereby enabling cables to be placed into the tidy from the side.

Preferably, the cable tidy comprises a groups of upper curve elements and lower curved elements, to together form the rings.

Preferably, the cable tidy is extendible and/or flexible along its length.

Preferably, the cable tidy comprises retainer hooks at at least respective ends of the tidy, to enable the tidy to be attached to an underside of a desk, a wall or other suitable surface Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the invention in any way.

DESCRIPTION OF EMBODIMENTS

Figure 1:
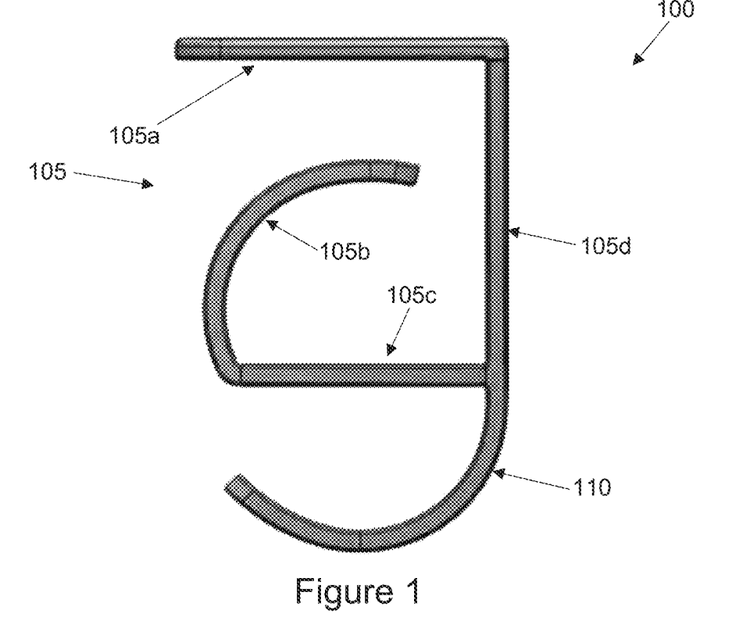
FIG. 1 illustrates a side view of a cable support device, according to an embodiment of the present invention.
Figure 2:
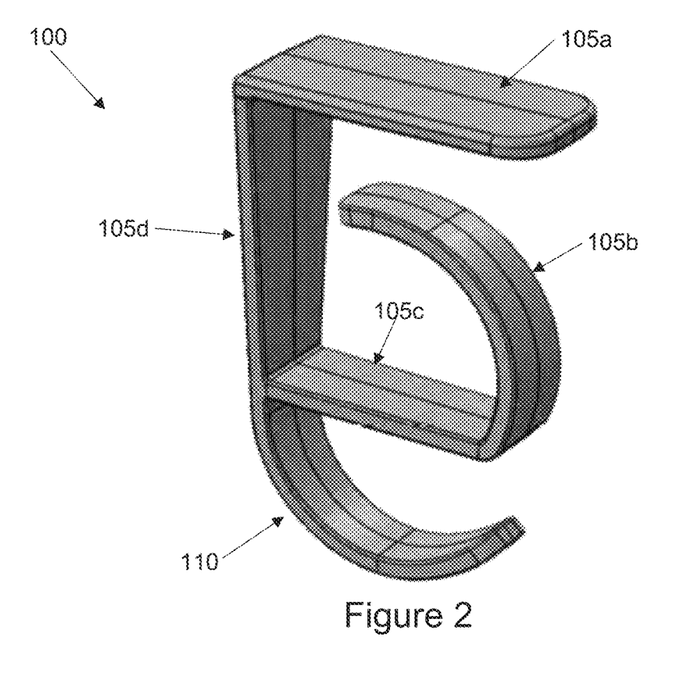
FIG. 2 illustrates an upper perspective view of the cable support device of FIG. 1.

FIG. 1 illustrates a side view of a cable support device 100, according to an embodiment of the present invention. FIG. 2 illustrates an upper perspective view of the cable support device 100.

The cable support device 100 may be quickly and releasably attached to surfaces of desks, tables and the like, and without adhesive and without damaging the surface, to enable cables to be supported thereunder. As such, the cable support device 100 provides a cost-effective means of providing a cable support that is easily usable and re-configurable.

The cable support device 100 includes a retainer 105 comprising a planar upper support member 105a and an opposing biasing member 105b, for retaining the cable support device 100 to an edge of the surface, as outlined in further detail below.

The biasing member 105b is resilient, and may flex downwards when the retainer 105 is installed onto a surface, such as a desk. In such case, the biasing member 105b applies a resilient force back up onto a bottom of the surface in a direction towards the upper support member. As a result, the biasing member 105b essentially functions as a leaf spring, clamping the surface between an upper surface of the biasing member 105b and a lower surface of the planar upper support member 105a.

As the biasing member 105b is flexible, the retainer 105 is able to conform to surfaces of different thicknesses. In particular, on a thick desk, the biasing member 105b will flex greater than a thin desk. Furthermore, as the biasing member is at a lower end of the retainer 105, and the upper portion of the retainer 105 comprises a planar upper support member 105a, the device 100 does not change in appearance from above depending on the thickness of the desk.

The retainer 105 comprises a C-channel, including a planar lower member 105c, which is parallel to the planar upper support member 105a, and joined thereto by an intermediate member 105d. The planar upper support member 105a is coupled to the intermediate member 105d at a right angle, and the planar lower member 105c is coupled to the intermediate member 105d at a right angle, thereby creating a C-channel.

The opposing biasing member 105b extends upwardly from and is coupled to an end of the planar lower member 105c, and curves inwards towards a centre of the C-channel. The biasing member 105b thereby guides the surface into the retainer 105, simplifying installation of the retainer 105 onto the surface.

The cable support device 100 further includes a cable support 110, coupled to the retainer 105, and configured to support one or more cables.

The cable support 110 comprises an open segment, which enables cables to be positioned therein without requiring the cables to disconnected or fed through any apertures. In particular, the cable support 110 comprises an arm, extending downwardly from a base of the retainer in a continuously curved manner such that it eventually curves back upwards, thereby providing a hook. In other words, the cable support is U-shaped in cross-section.

The device 100 is substantially uniform in width and substantially uniform in thickness. Similarly, the device 100 is substantially uniform in cross-section, and may be formed by extrusion.

Figure 3:
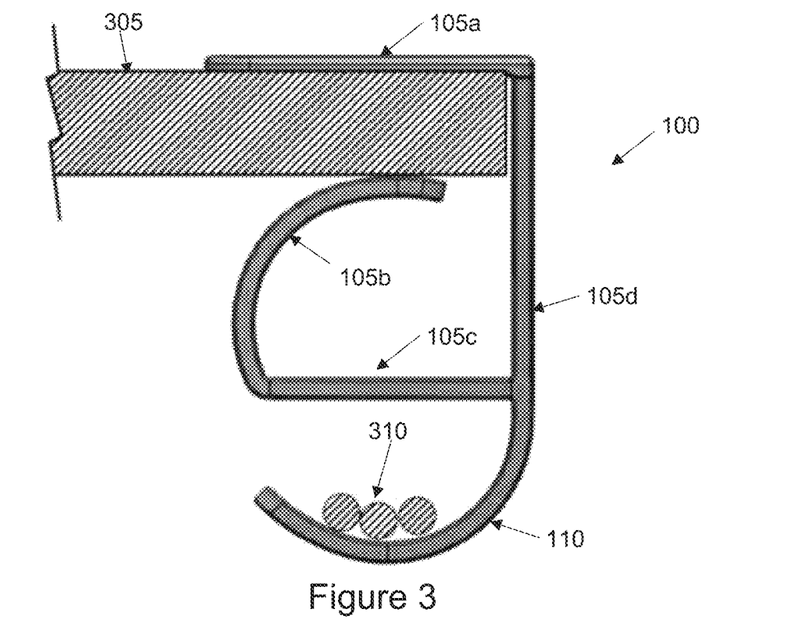
FIG. 3 illustrates a side view of the cable support device of FIG. 1 in use on a desk, according to an embodiment of the present invention.

FIG. 3 illustrates a side view of the cable support device 100 in use on a desk 305, according to an embodiment of the present invention.

The planar upper support member 105a sits flush against an upper surface of the desk 305, and the intermediate member 105d extends downwardly therefrom at an edge of the desk. As such, after the cable support device 100 is installed, the desk 305 may be placed directly against a wall.

The biasing member 105b engages with an underside of the desk 305, and thereby clamps an edge of the desk 305, retaining the device 100 to the desk.

Cables 310 are provided in the cable support 110. As the cable support 110 is open on an inside of the surface (i.e. away from the edge of the surface), cables may be simply placed in the support 110 from the side, even when the desk 305 is positioned against a wall.

As an upper edge of the biasing member 105b engages with an underside of the desk 305, an inside of the C-section is free from obstruction, and cables may be installed in an inside of the biasing member 105b. As this area is not open on its in or outside, cables must be fed through an aperture defined within the C-section. As a result, this upper area is best suited for cables that are less likely to require easy access.

The planar upper support member 105a may be about 60 mm long, and the device may be about 93 mm high. The device may have a thickness of about 4 mm. The device may be configured to couple to a surface (e.g. desk) having a thickness of between about 20 mm and 30 mm.

While the above embodiments illustrate a device having substantially uniform thickness, in other embodiments, portions may be provided with different thickness to provide greater rigidity and/or flexibility, depending on a function of the portion.

Figure 4:
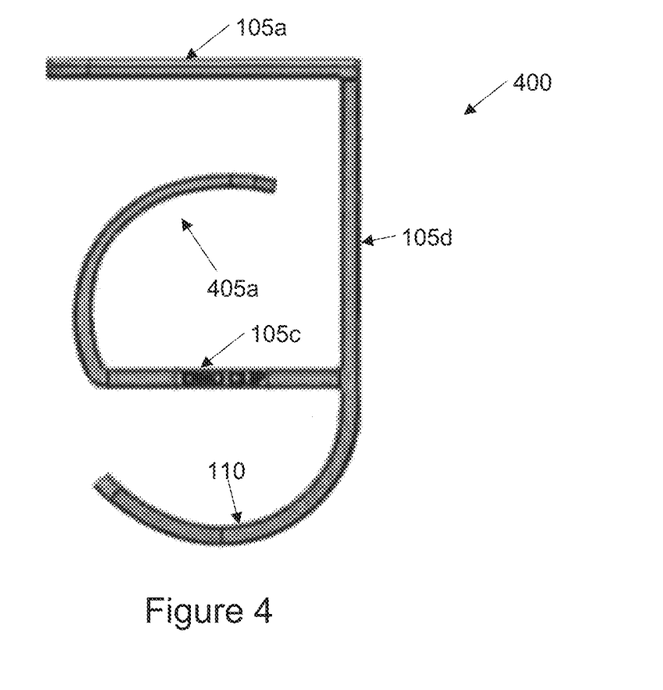
FIG. 4 illustrates a side view of a cable support device, according to an embodiment of the present invention.

FIG. 4 illustrates a side view of a cable support device 400, according to an embodiment of the present invention. The cable support device 400 is similar to the device 100, but with a biasing member 405a that is tapered in thickness such that it is thinner at its end than at its base.

Such configuration provides variable flexibility along the length of the biasing member, which ensures that the end is more flexible than the base. This in turn makes the biasing member 405a better suited for desks having different thicknesses, as it ensures that the biasing member distorts (like compression of a leaf spring) before the device 400 as a whole distorts.

The biasing member 405a may be about 4 mm thick at its base, and about 3 mm thick at its end.

The biasing member 405a may also have a narrower width to further increase flexibility of its end.

The devices 100, 400 are unitarily formed of a single material. In other embodiments, however, combinations of materials may be used to provide different functionality.

Figure 5:
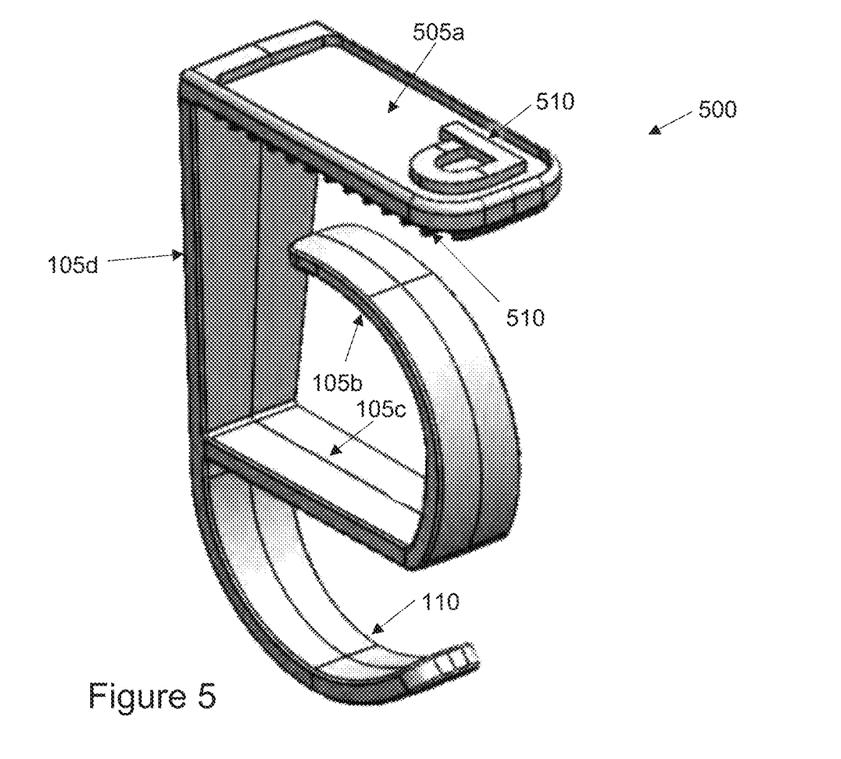
FIG. 5 illustrates an upper perspective view of a cable support device, according to an embodiment of the present invention.
Figure 6:
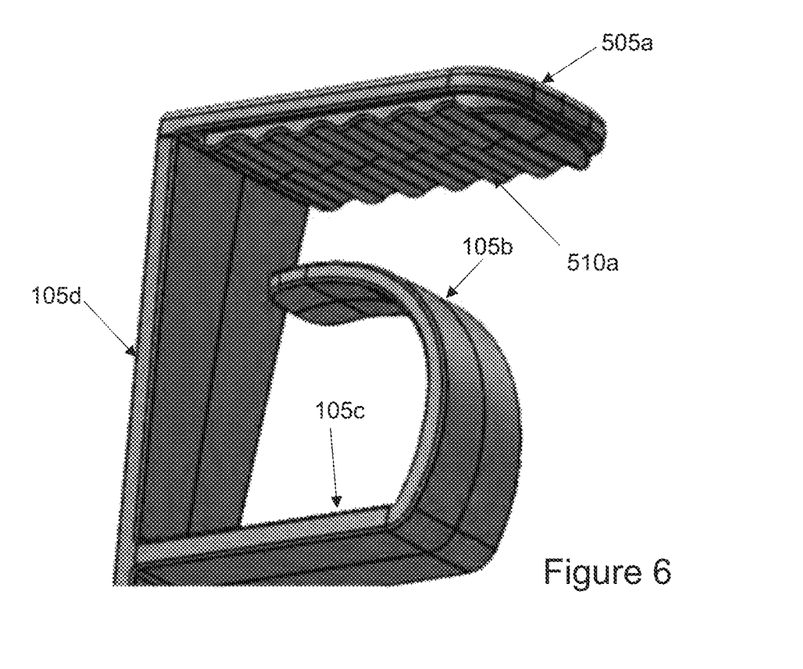
FIG. 6 illustrates a lower perspective view of a portion of the cable support device of FIG. 5.

FIG. 5 illustrates an upper perspective view of a cable support device 500, according to an embodiment of the present invention. FIG. 6 illustrates a lower perspective view of a portion of the cable support device 500.

The cable support device 500 is similar to the cable support device 100 but includes an elastomeric gripping member 510 coupled to an inside of a planar upper support member 505a.

The elastomeric gripping member 510 may comprise rubber, rubber-like material, or any suitable material, which extends along an inside of the planar upper support member 505a. A plurality of ribs 510a extend along an inside length of the elastomeric gripping member 510 to assist the gripping member 510 in gripping to a surface, and preventing slipping from the surface.

The planar upper support member 505a includes an aperture (obscured) through which the gripping member 510 extends, which enables the gripping member to be attached to the planar upper support member 505a without the use of adhesives. The aperture extends though the planar upper support member 505a from one side to the other.

While the above examples illustrate partially curved devices, the skilled addressee will readily appreciate that other shapes, including those comprising entirely planar members, may be provided.

Figure 7:
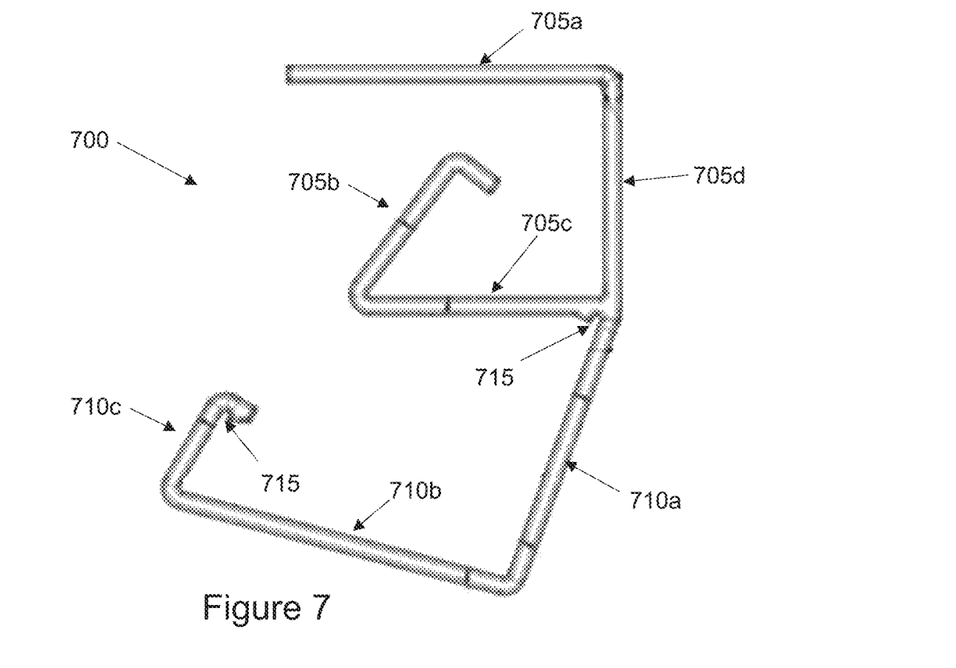
FIG. 7 illustrates a side view of a cable support device, according to an embodiment of the present invention.
Figure 8:
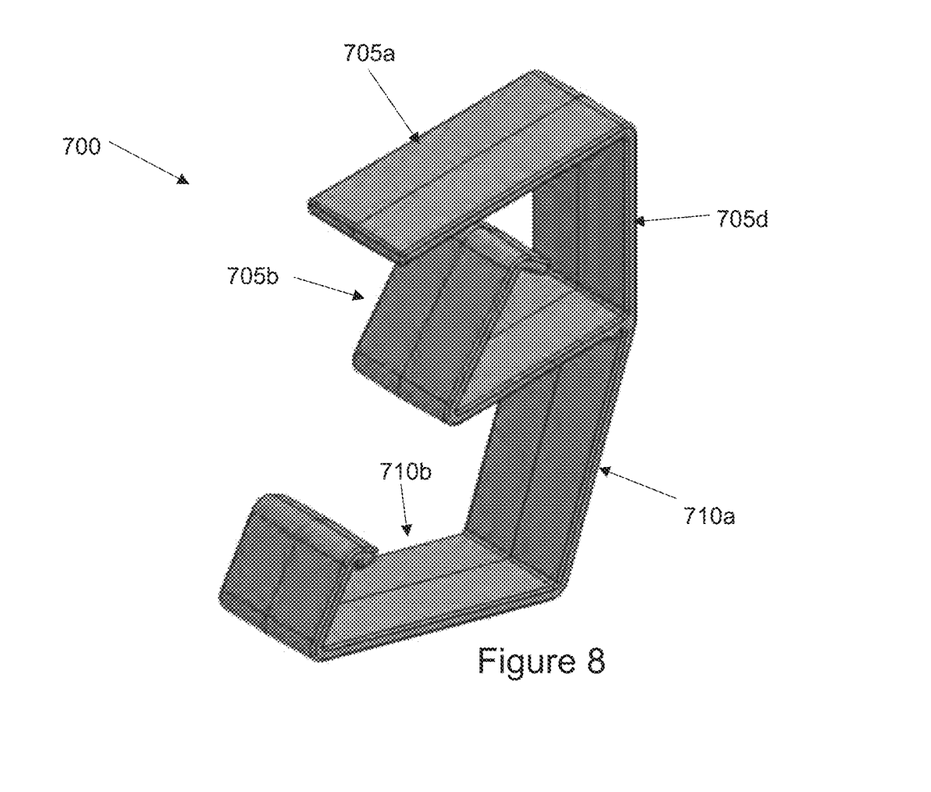
FIG. 8 illustrates an upper perspective view of the cable support device of FIG. 7.

FIG. 7 illustrates a side view of a cable support device 700, according to an embodiment of the present invention. FIG. 8 illustrates an upper perspective view of the cable support device 700.

The cable support device 700 is similar to the cable support device 100, but is formed of a plurality of planar members, rather than curved members.

The cable support device 700 includes a retainer 705 and a cable support 710 coupled to the retainer 705, like the device 100.

The retainer 705 comprises a planar upper support member 705a and an opposing biasing member 705b, for retaining the cable support device 700 to an edge of a surface, such as a desk or table. The planar upper support member 705a is coupled to an intermediate member 705d at a right angle, which is in turn coupled to a planar lower member 705c at a right angle, thereby creating a C-channel, again much like in the device 100. The biasing member 705b extends upwardly from an end of the planar lower member 705c at an acute angle, and has an inwardly and downwardly curved lip at an end thereof.

The cable support 710 comprises an open segment in the form of a downwardly extending member 710a, an inwardly extending member 710b coupled to an end of the downwardly extending member 710a, and an upwardly extending member 710c coupled to an end of the inwardly extending member 710b. Such configuration provides a pseudo U-shaped member from a plurality of distinct planar members.

The upwardly extending member 710c includes an upper lip to prevent cables from sliding out from the cable support in use.

The cable support device 705 is particularly suited for holding a cable tray, which may in turn hold cables and other items. The cable support device 705 includes notches 715 for receiving and retaining edges of such a tray.

Figure 9:
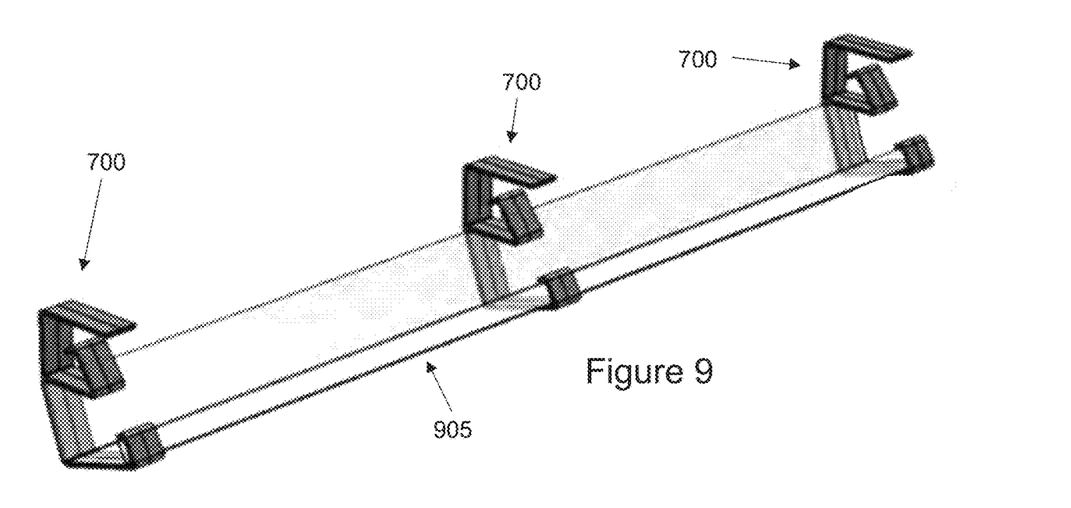
FIG. 9 illustrates an upper perspective view of a plurality of cable support devices of FIG. 7 with a cable tray extending therebetween.

FIG. 9 illustrates an upper perspective view of a plurality of cable support devices 700 with a cable tray 905 extending therebetween.

The tray 905 has substantially the same cross section as an inside of the cable support. As such, the tray 905 comprises a planar base from which side portions upwardly extend.

The notch 715 of the downwardly curved lip at the end of the upwardly extending member 710c engages with an upper edge of a side portion of the tray 905, and the notch 715 at the lower side of the planar lower member 705c engages with an upper edge of the opposing side portion of the tray 905. As such, the tray 905 is held in a fixed position by the cable support devices 700.

In addition to providing storage, the tray 905 may provide additional rigidity to the structure, joining individual cable support devices 700, and preventing these cable support devices 700 from sliding out of position.

Figure 10:
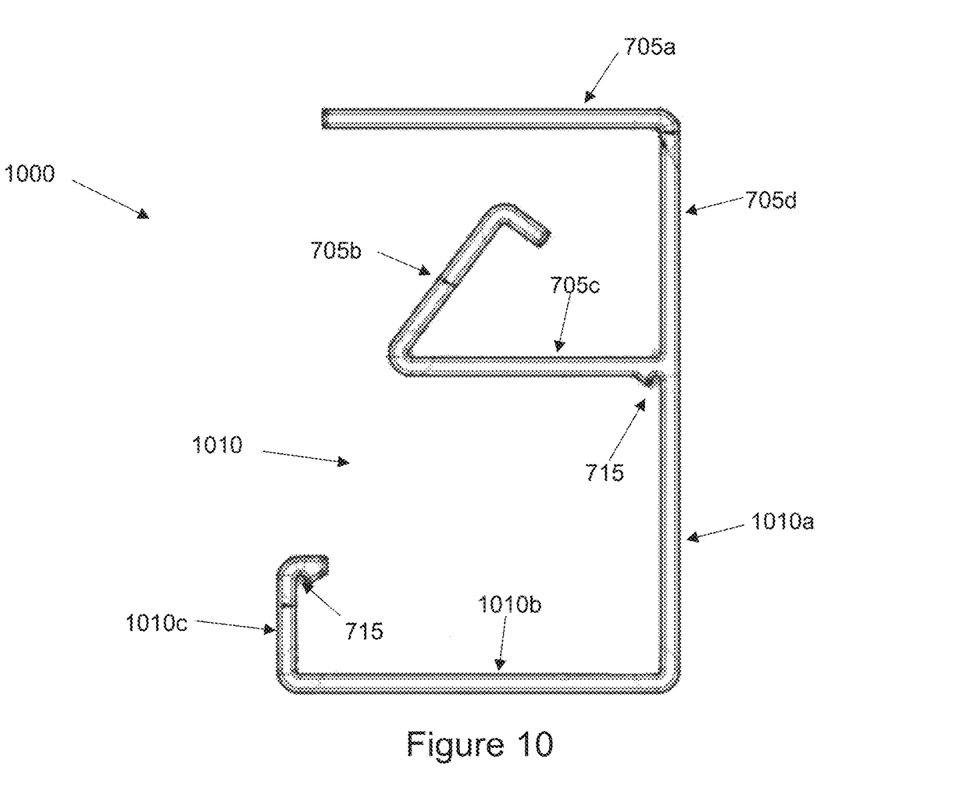
FIG. 10 illustrates a side view of a cable support device, according to an embodiment of the present invention.
Figure 11:
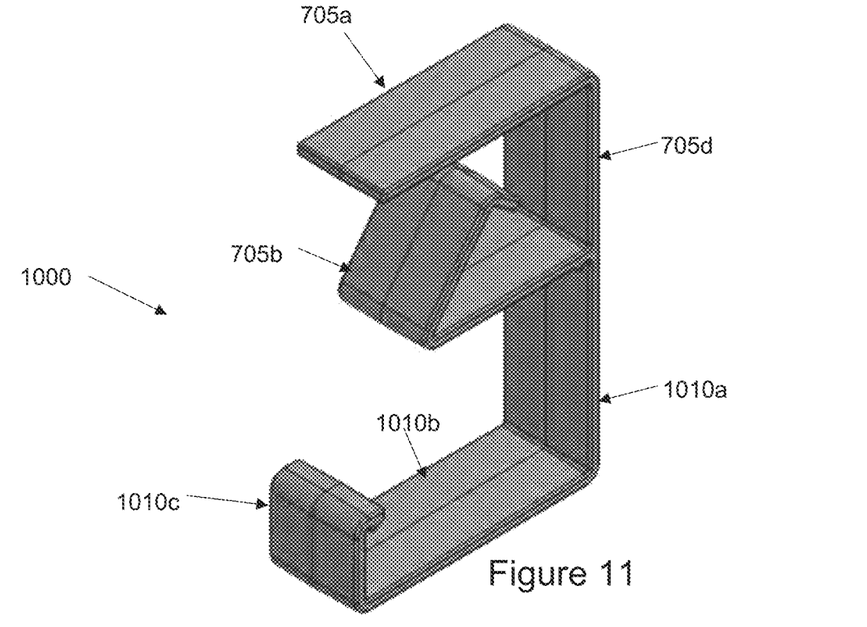
FIG. 11 illustrates an upper perspective view of the cable support device of FIG. 10.

FIG. 10 illustrates a side view of a cable support device 1000, according to an embodiment of the present invention. FIG. 11 illustrates an upper perspective view of the cable support device 1000.

The cable support device 1000 is similar to the cable support device 700, but includes a straight (rather than angled) base.

In particular, the device 1000 includes a cable support 1010 comprises an open segment in the form of a downwardly extending member 1010a, an inwardly extending member 1010b coupled to an end of the downwardly extending member 1010a, and an upwardly extending member 1010c coupled to an end of the inwardly extending member 1010b.

Such configuration also provides a pseudo U-shaped member from a plurality of distinct planar members, and is configured to receive a tray (not illustrated).

The cable support 1010 is open, and the opening on the inside is smaller than the cable support 1010. As a result, the inwardly extending member 1010b may be momentarily bent downwards to enlarge the opening, to thereby receive a power plug or similar sized item. That item is then retained in the cable support 1010.

Figure 12:
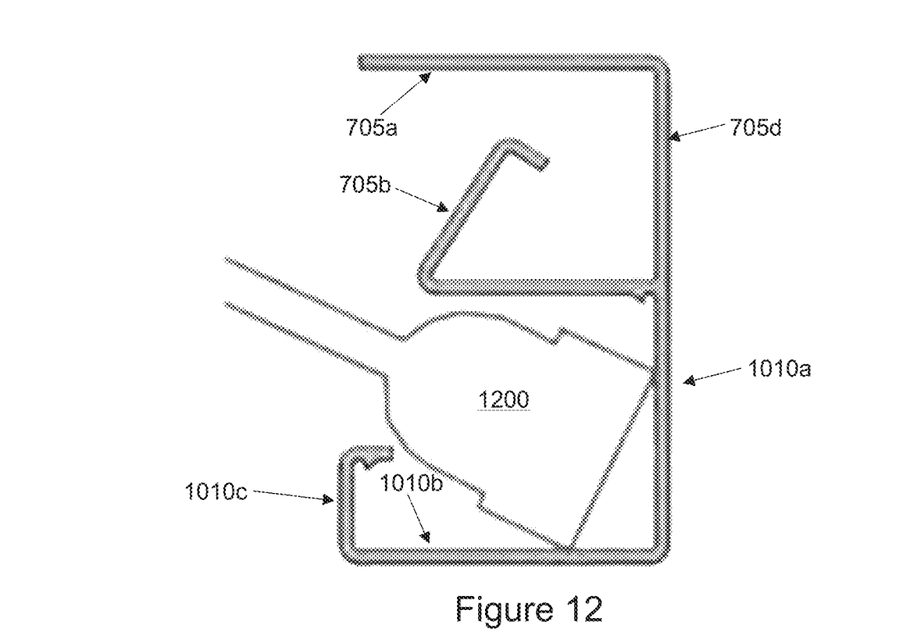
FIG. 12 illustrates a side view of the cable support device of FIG. 10 retaining a power plug.

FIG. 12 illustrates a side view of a cable support device 1000 with a power plug 1200 retained therein. As the head of the plug 1200 is larger than the opening, it is retained in the cable support 1010. In case a tray is used, the tray may have similar characteristics, i.e. having an inside larger than the opening. This may similarly be momentarily enlarged, if desired, to receive a larger item.

While the above cable support devices are open on an inside for receiving cables, in other embodiments, the cable support devices include cable supports open from an outside. Such configuration is particularly useful when cables are to be supported from behind a desk or table.

Figure 13:
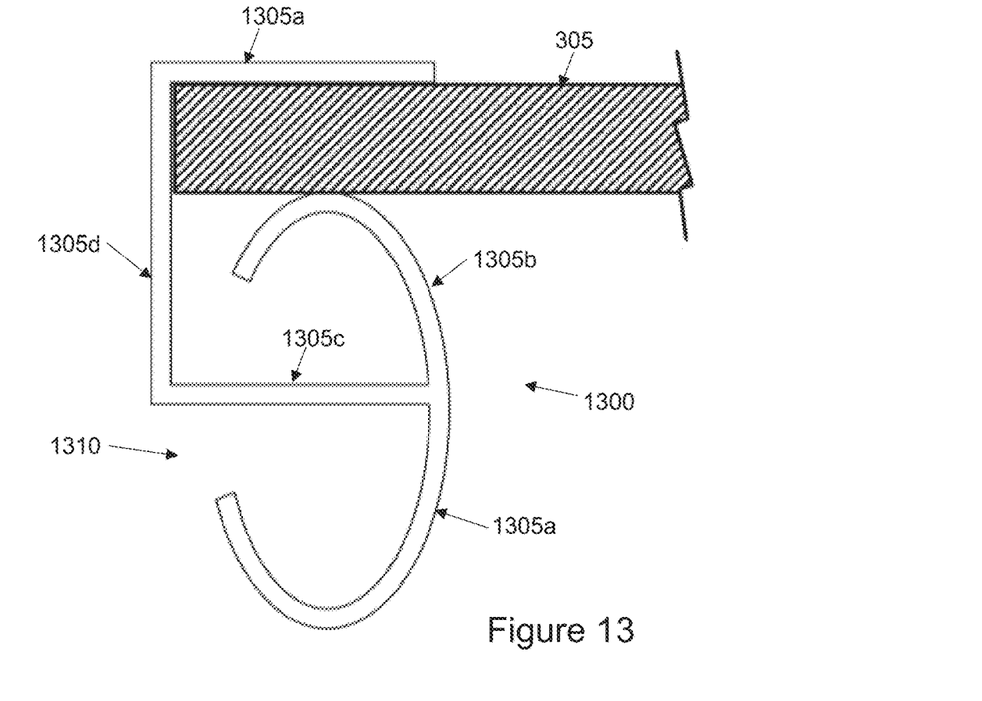
FIG. 13 illustrates a side view of a cable support device installed on a desk, according to an embodiment of the present invention.

FIG. 13 illustrates a side view of a cable support device 1300 installed on a desk 305, according to an embodiment of the present invention.

The cable support device 1300 includes a retainer 1305 and a cable support 1310 coupled to the retainer 1505.

The retainer 1305 includes a planar upper support member 1305a and an opposing biasing member 1305b, for retaining the cable support device 1300 to an edge of a surface, such as a desk or table. The planar upper support member 1305a is coupled to an intermediate member 1305d at a right angle, which is in turn coupled to a planar lower member 1305c at a right angle, thereby creating a C-channel, much like in the device 100. The biasing member 1305b extends upwardly from an end of the planar lower member 1305c in a curved manner to function as a leaf spring.

The cable support 1310 comprises an open segment in the form of a downwardly extending member 1310a, that extends downwardly from a base of the retainer 1305 in a continuously curved manner such that it eventually curves back upwards, thereby providing a hook.

The cable support 1310 is, however, open on an outside, enabling cables to be positioned therein from an outside of the desk or similar surface.

One benefit of such configuration, in addition to enabling easy access from an outside or behind of the desk, is that it may be used in a vertical configuration on a door, divider or other similar surface.

Figure 14:
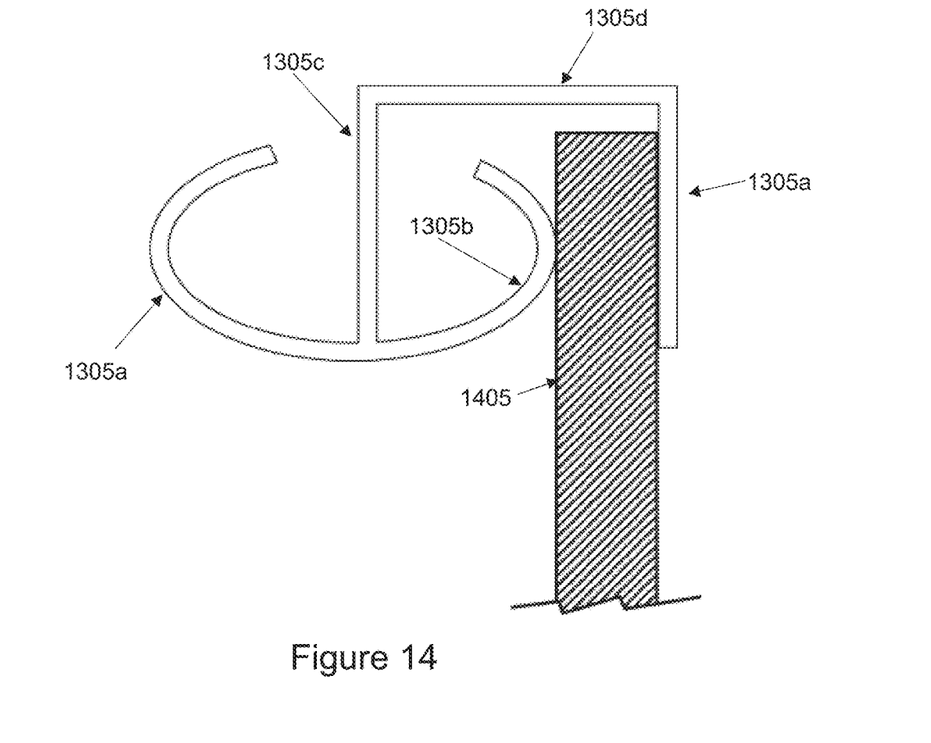
FIG. 14 illustrates a side view of a cable support device in use on a vertical surface and in a vertical configuration, according to an embodiment of the present invention.

FIG. 14 illustrates a side view of a cable support device 1300 in use on a vertical surface 1405 and in a vertical configuration, according to an embodiment of the present invention.

As the retainer comprises a curved downwardly extending member 1310a, it may function in a similar manner on its side in the vertical configuration as it does in the horizontal configuration.

While the above cable support devices sit flush with an edge of the surface, may be desirable for cable support to extend outwardly from surface.

Figure 15:
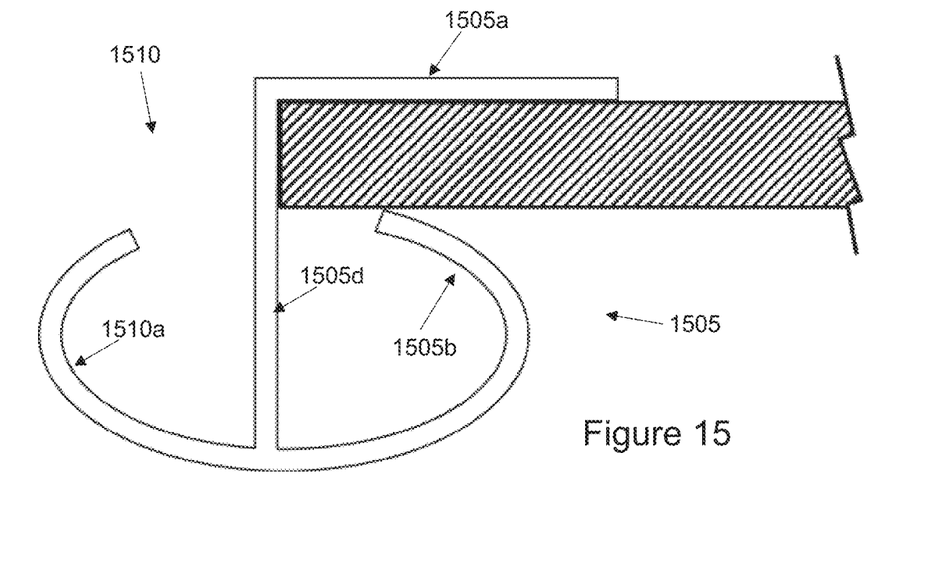
FIG. 15 illustrates a side view of a cable support device, according to an embodiment of the present invention.

FIG. 15 illustrates a side view of a cable support device 1500, according to an embodiment of the present invention.

The cable support device 1500 is similar to the cable support device 1300, but extends outwardly from the surface, enabling cables to be supported at an outer edge of the surface, and accessible from above (rather than being provided under the surface).

The cable support device 1500 includes a retainer 1505 and a cable support 1510 coupled to the retainer 2505.

The retainer 1505 includes a planar upper support member 1505a and an opposing biasing member 1505b, for retaining the cable support device 1500 to an edge of a surface, such as a desk or table. The planar upper support member 1505a is coupled to an intermediate member 1505d at a right angle, which is in turn coupled to the biasing member 1505b, which extends outwardly and upwardly from an end of the intermediate member 1505d in a curved manner to function as a leaf spring.

The cable support 1510 comprises an open segment in the form of an outwardly and upwardly extending member 1510a, that extends from a bottom end of the intermediate member 1505d and thus retainer 1505 in a continuously curved manner such that it eventually curves back inwards, thereby providing a hook.

The cable support 1510 is, however, open from above, enabling cables to be positioned therein from above the desk or similar surface.

One benefit of such configuration is that it may be used when access from below the desk is not possible or desirable.

While the above embodiments illustrate a retainer having separate and distinct retainers and cable supports, the skilled addressee will readily appreciate that the retainer may extend continuously to be become the cable support, and thus both be formed of a single curve member.

Figure 16:
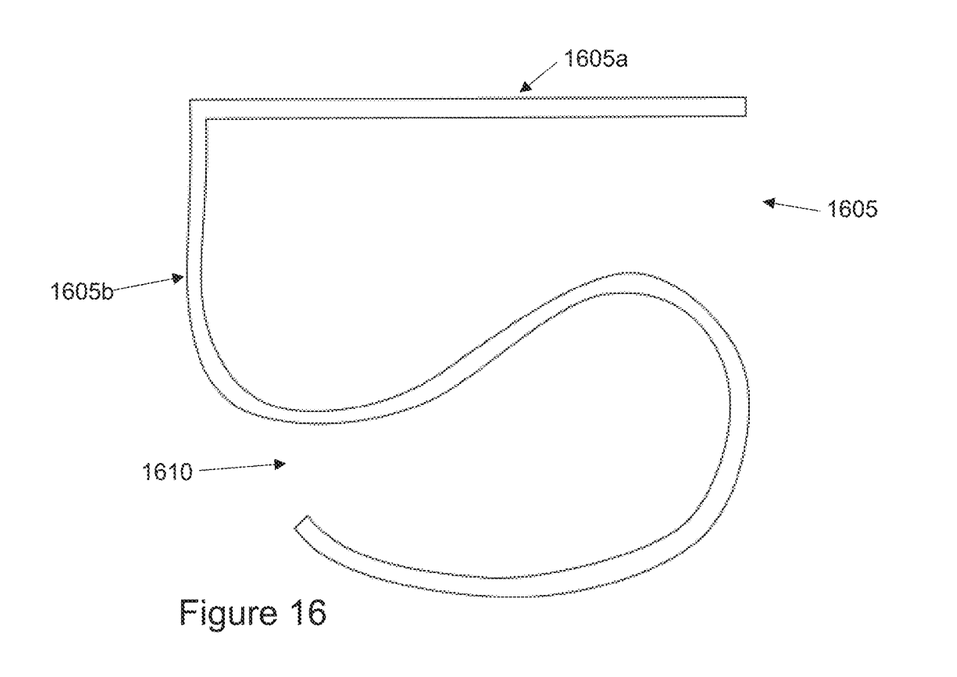
FIG. 16 illustrates a side view of a cable support device, according to an embodiment of the present invention.

FIG. 16 illustrates a side view of a cable support device 1600, according to an embodiment of the present invention.

The cable support device 1600 includes a retainer 1605 and a cable support 1610, which are formed from a continuously extending member 1605b, which extends downwardly from a planar upper support 1605a. The continuously extending member 1605b is curved to function as a leaf spring, and ultimate curve backwards again to function as a curved cable retainer.

The above cable support devices illustrate examples of cable support devices that have different shapes, but broadly function in the same manner. The skilled addressee will readily appreciate that any number of suitable shapes may be used, including combinations of the above examples.

In another aspect, embodiments of the invention reside broadly in cable ties, which may group or tie cables together. Such ties may be used together with the retainers above to prevent individual cables from working their way loose, or to group cables together outside of the retainers.

Figure 17:
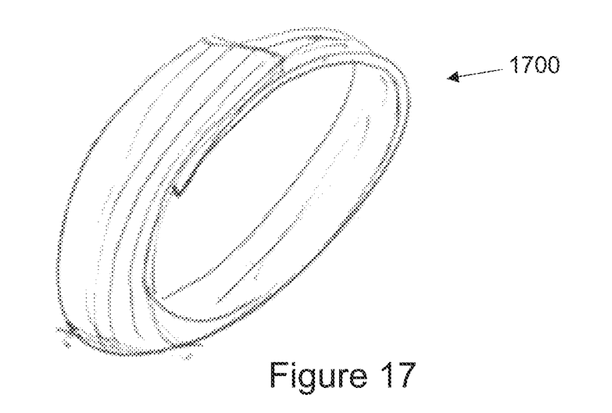
FIG. 17 illustrates a cable tie, according to an embodiment of the present invention.
Figure 18:
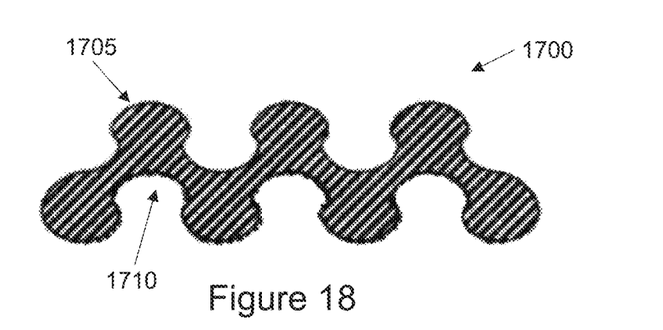
FIG. 18 illustrates a cross section of the cable tie of FIG. 17.
Figure 19:
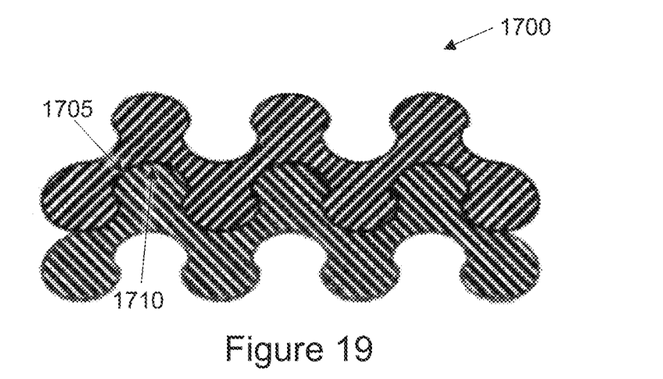
FIG. 19 illustrates a cross section of the cable tie of FIG. 17 at an overlapping portion.

FIG. 17 illustrates a cable tie 1700, according to an embodiment of the present invention. FIG. 18 illustrates a cross section of the cable tie 1700, and FIG. 19 illustrates a cross section of the cable tie 1700 at an overlapping portion.

The cable tie 1700 is extruded, and has a substantially uniform cross section along it length, but is imparted with a slight curve such that the material, if not cut, forms circles or a spiral shape.

An outside of the cable tie 1700 comprises a plurality of male members 1705, which engage with and lock into corresponding female portions 1710 of the inside of the cable tie 1700. The male and female portions 1705, 1710 are bulb-shaped.

As a result, the cable tie is looped onto itself to form a circle, wherein the male and female portions 1705, 1710 lock the ends of the tie 1700 together in a loop, and thus the cables therein together.

In addition to providing locking, the male and female portions increase surface area, and thereby use friction to keep the ends joined, rather than sliding apart.

The cable tie 1700 may be cut to any desirable length and wrapped around cables to tie them together. In particular, long lengths of cable tie may be used for many cables, and smaller lengths may be used to group few cables.

The cable tie 1700 may be re-used multiple times, simply by separating and re-joining the male and female portions 1705, 1710.

Figure 20:
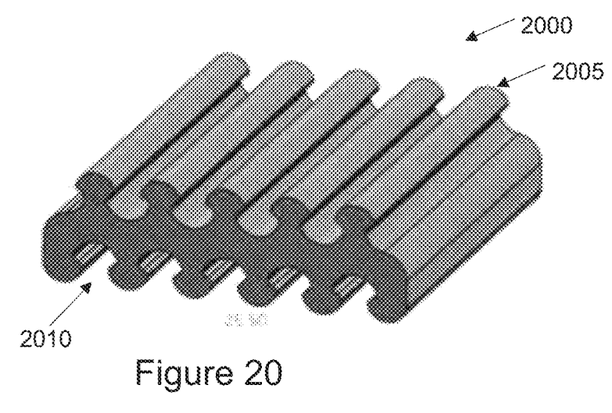
FIG. 20 illustrates a perspective view of a portion of a cable tie, according to an embodiment of the present invention.

FIG. 20 illustrates a perspective view of a portion of a cable tie 2000, according to an embodiment of the present invention. The cable tie 2000 is similar to the cable tie 1700, but includes a greater number of male and female portions 2005, 2010 in a repeated pattern.

Figure 21:
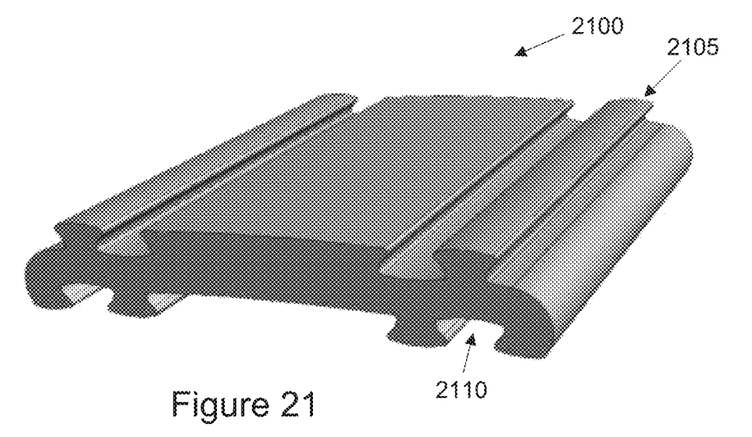
FIG. 21 illustrates a perspective view of a portion of a cable tie, according to an embodiment of the present invention.
Figure 22:
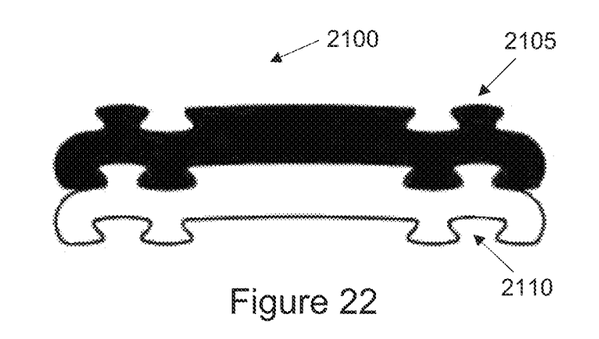
FIG. 22 illustrates a cross-sectional view of a join of the cable tie of FIG. 21.

FIG. 21 illustrates a perspective view of a portion of a cable tie 2100, and FIG. 22 illustrates a cross-sectional view of a join of the cable tie 2100.

The cable tie 2100 includes male and female portions 2105, 2110, similar to the cable ties 1700, 2000, but on respective edges of the cable tie rather than continuously across its width. Furthermore, the male and female portions 2105, 2110 are dovetail shaped.

In yet another aspect, embodiments of the invention reside broadly in cable tidies. Such tidies may be used together with the retainers above (e.g. to extend between retainers), to support cables, or independently.

Figure 23:
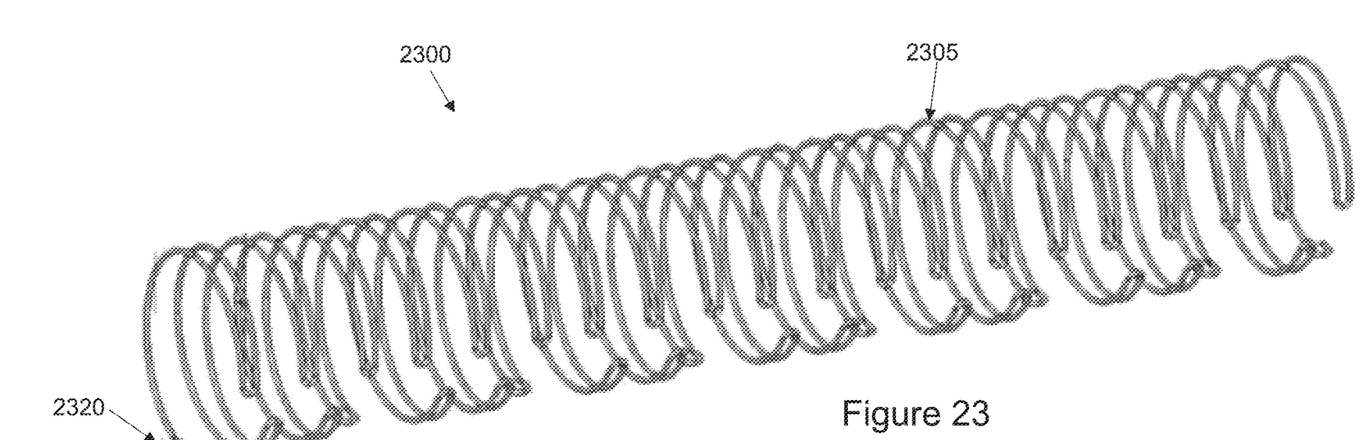
FIG. 23 illustrates a perspective view of a cable tidy, according to an embodiment of the present invention.
Figure 24:
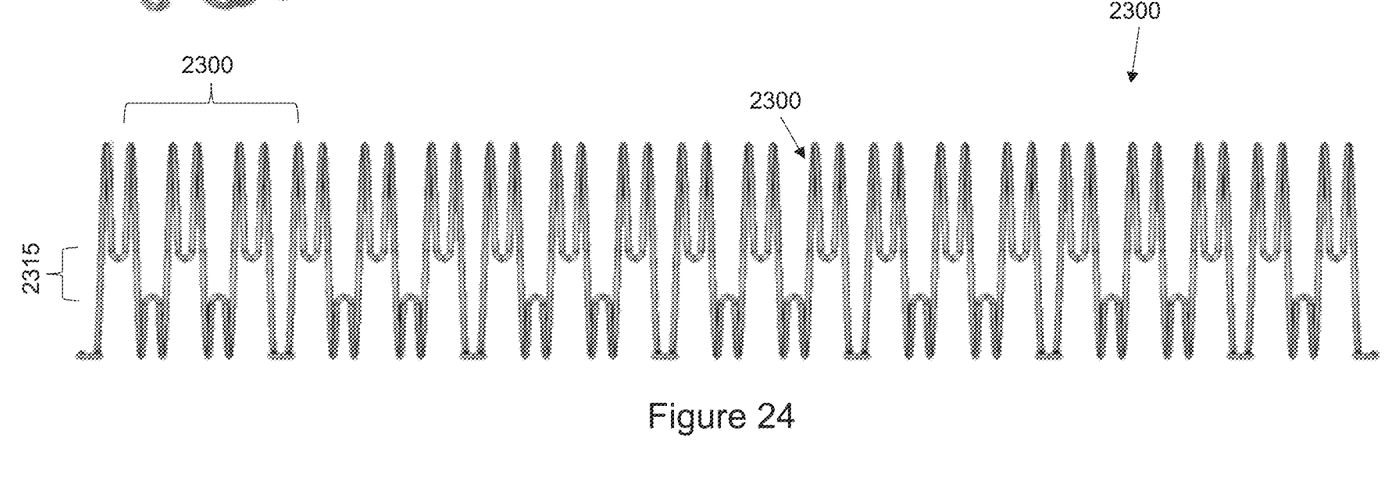
FIG. 24 illustrates a front view of the cable tidy of FIG. 23.

FIG. 23 illustrates a perspective view of a cable tidy 2300, according to an embodiment of the present invention. FIG. 24 illustrates a front view of the cable tidy 2300.

The cable tidy 2300 may function much like a cable tray, but is flexible, enabling it to curve and conform to any suitable shape. Alternatively, the cable tidy may be used to simply group cables together, alleviating or reducing the need for cable ties.

The cable tidy 2300 comprises a single continuous wire 2305 that is folded back and forward in a zig-zag like manner, forming a repetitive pattern 2310 of open rings. Each pattern 2310 comprises groups of upper curve elements and lower curved elements, which are spaced from each other creating an opening 2315 that extends along its length. As such, cables may be placed into the cable tidy 2300 from the side, without having to wind the tidy around the cables.

Finally, retainer hooks 2320 are provided at respective ends of the tidy 2300, to enable the tidy to be attached to an underside of a desk, a wall or other suitable surface.

The wire 2305 need not be formed of metal, or be physically, folded, but may instead be formed of plastic, e.g. through injection moulding.

Advantageously, the cable management devices described above provide simple and efficient means of managing cables, particularly in the context of an office or workspace. The devices do not require tools to install, and may be temporarily installed without damaging the surfaces with which they are used.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

I claim:

1. A cable support device including:
   a retainer, for retaining the cable support device to an edge of a surface, the retainer comprising:
   a planar upper support member;
   an opposing biasing member, configured to bias towards the planar upper support member to thereby retain the retainer to the surface, the biasing member tapered along its length, such that it is more flexible at its end; and
   a planar intermediate member, from which the planar upper support member extends in a first direction, wherein the planar intermediate member is configured to abut the edge of the surface; and
   a cable support, coupled to the retainer, and configured to support one or more cables.

2. The cable support device of claim 1, wherein the cable support comprises an open segment.

3. The cable support device of claim 1, wherein the cable support comprises an arm, extending from a base of the retainer.

4. The cable support device of claim 3, wherein the arm is curved.

5. The cable support device of claim 1, wherein the cable support is U-shaped in cross-section.

6. The cable support device of claim 1, wherein the cable support initially extends downwardly from the retainer, and subsequently upwardly.

7. The cable support device of claim 1, wherein the cable support includes a lip or edge to prevent cables sliding out from the cable support.

8. The cable support device of claim 1, wherein the biasing member is resilient, and configured to apply resilient force to the surface in a direction of the upper support member.

9. The cable support device of claim 1, wherein the biasing member is curved.

10. The cable support device of claim 1, wherein the retainer comprises a C-channel, wherein the biasing member is provided on an inside of the C-channel.

11. The cable support device of claim 1, wherein the biasing member is configured to function as a leaf spring against the surface, and wherein the retainer is configured to conform to surfaces of different thicknesses.

12. The cable support device of claim 1, wherein the planar upper support member is coupled to the opposing biasing member by the intermediate member.

13. The cable support device of claim 1, wherein the cable support extends downwardly from a lower portion of the biasing member.

14. The cable support device of claim 1, wherein the device is substantially uniform in cross-section.

15. The cable support device of claim 1, wherein the cable support includes a retaining portion that is larger than its opening.

16. The cable support device of claim 1, wherein the retainer and the cable support are formed of a continuously extending member, the continuously extending member curving to form the retainer and the cable support.

17. The cable support device of claim 1, wherein the retainer includes a gripping member attached thereto.

18. The cable support device of claim 17, wherein the planar upper support member includes the gripping member on an inside thereof.

19. The cable support device of claim 1, wherein the cable support is configured to receive a tray, for supporting the one or more cables, wherein the tray extends between cable supports of adjacent devices and wherein the tray is of substantially the same cross section as an inside of the cable support.

20. The cable support device of claim 1, wherein the retainer and the cable support are unitarily formed.

* * * * *